A. MORRISON.
HOG FEEDER.
APPLICATION FILED SEPT. 22, 1920.

1,383,655.

Patented July 5, 1921.
2 SHEETS—SHEET 1.

Inventor,
A. Morrison.
By C. A. Snow & Co.
Attorneys

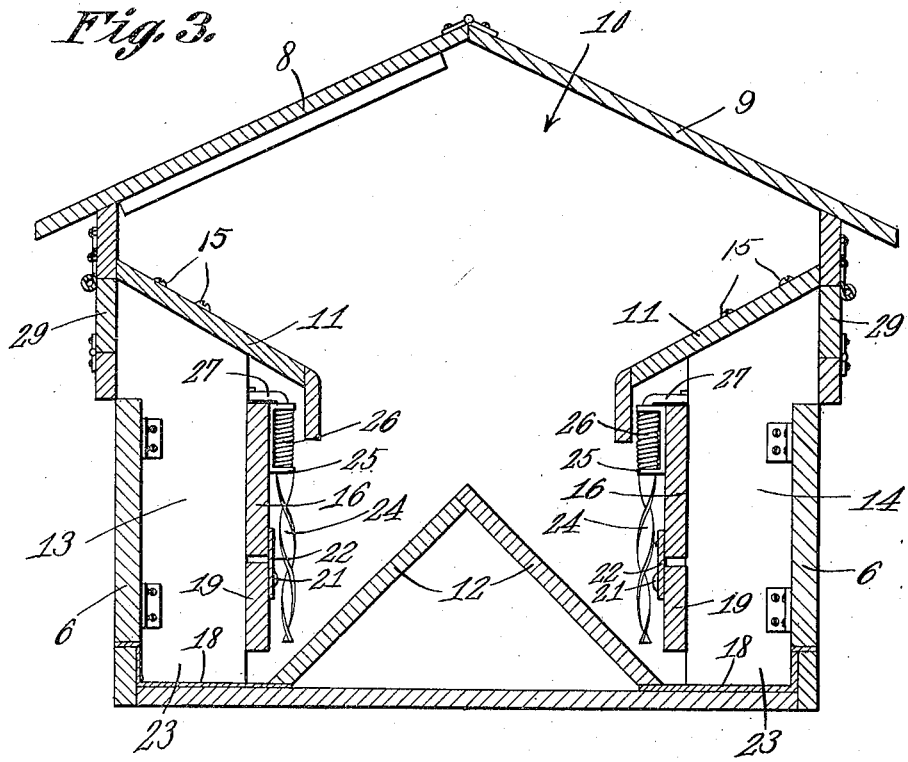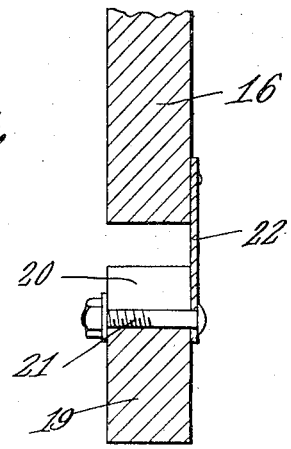

UNITED STATES PATENT OFFICE.

ARTHUR MORRISON, OF HAMILTON, ILLINOIS.

HOG-FEEDER.

1,383,655.　　　　Specification of Letters Patent.　　Patented July 5, 1921.

Application filed September 22, 1920. Serial No. 411,967.

*To all whom it may concern:*

Be it known that I, ARTHUR MORRISON, a citizen of the United States, residing at Hamilton, in the county of Hancock and State of Illinois, have invented a new and useful Hog-Feeder, of which the following is a specification.

This invention relates to feeding devices for hogs or like animals, and it is the primary object of the invention to provide a feeding device having novel means to prevent the feed from being wasted or thrown from the feeding device during the feeding of the animals.

A further object of the invention is to provide automatically operated agitating members disposed within the feed receptacle, whereby the feed within the receptacle will be agitated to insure a distribution of the feed into the feed trough.

A still further object of the invention is the provision of means to normally close the feed trough, the means for closing the trough being operated by the animals.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Fig. 3 illustrates a longitudinal sectional view through the feeding device, and Fig. 4 illustrates a fragmental detail view of the feed adjusting means.

Figure 1:
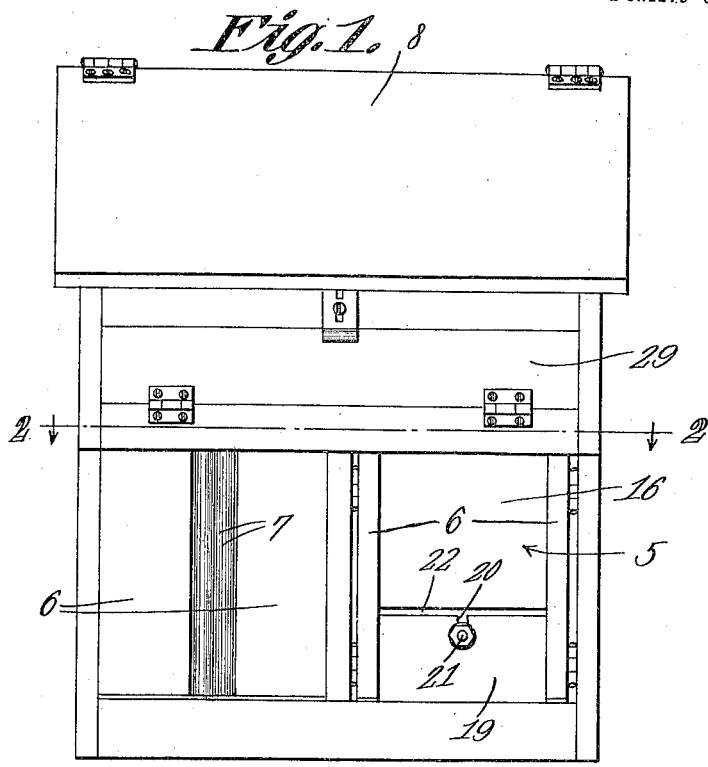
Figure 1 illustrates a side elevational view of a feeding device constructed in accordance with the present invention.
Figure 2:
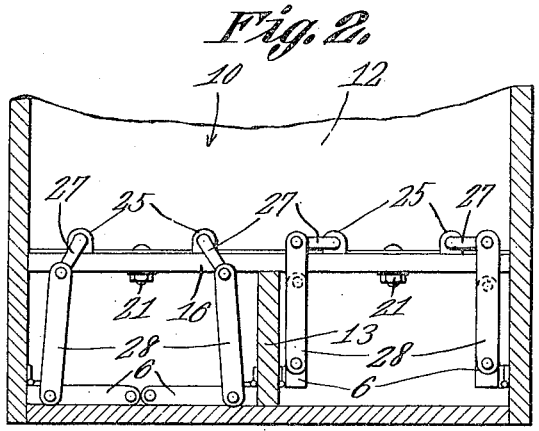
Fig. 2 illustrates a sectional view taken on line 2—2 of Fig. 1.

Referring to the drawings in detail, the feeding device includes a box-like construction having openings 5 formed in the opposite side walls thereof, the openings 5 being controlled by the opposed hinged closures 6, which carry rollers 7 at the adjacent edges thereof, the rollers being for the purpose of preventing an animal from being caught between the closures, when the animal is removing his head from the feeder.

The body portion of the feeder also includes hinged roof sections 8 and 9, through which the main or feed container 10 is supplied with feed, there being provided inclined partitioning members 11, for directing the feed toward the center of the body portion of the feeder, where the feed falls on the inclined partitions 12, which are secured to the bottom or floor of the feeder so that the point of contact between the partitions will be substantially centrally of the body portion, causing the feed to be delivered toward the openings 5.

These partitioning members 11 are supported in their inclined positions by their contact with the central partitioning members 13 and 14, disposed intermediate the width of the body portion and partitioning the forward portion of the body into feeding troughs, the upper edges of the partitioning members 13 and 14 being inclined to accommodate the partitioning members 11, the screws 15 being provided to secure the partitioning members 11 to the partitioning members 13 and 14.

Secured to the rear edges of the partitioning members 13 and 14, are the supporting members 16, the lower edges thereof terminating at points in spaced relation with the floor 18 of the feeding device proper, and to the supporting members 16 are secured the adjustable feed controlling boards 19 each of which has a central slotted portion 20, designed to receive the bolt 21, which bolt connects the partition 16 and board 19, through the medium of the plates 22.

From the foregoing it is obvious that by moving the bolts 21 within their respective slots, the boards 19 may be adjusted with respect to the floor 18 to permit greater or less quantities of feed to pass into the feeding troughs 23.

The agitating members are in the form of convoluted bars 24, which are supported in the bearings 25 that are secured to the supporting members 16, there being provided coiled springs 26, which have connection with the respective agitating members for returning the same to their normal positions, after they have been operated to cause the feed to move into the feed troughs.

Formed on one end of each of the agitating members, is an arm 27 having a right angled end portion positioned within a suitable opening provided in its coöperating arm 28, which arm 28 has pivotal connection with one of the doors or closures 6, so that movement of the closures will result in a relative rotary movement of the agitating members. A hinged door indicated at 29 is provided above the respective closures 5, and at the lower edges of the roof, so that by hinging the door downwardly, access to the upper portion of the troughs, may be had.

In view of the foregoing description, it is believed that a further detail description of the operation of the device is unnecessary.

Having thus described the invention, what is claimed as new is:—

In a feeding device, a main receptacle, partitions within the main receptacle for dividing the same into feed troughs, means for controlling the passage of feed to the feed troughs, hinged doors for closing the feed troughs, vertically disposed rollers extending throughout the lengths of the hinged doors, and arranged at the adjacent edges of the doors, and means for agitating feed within the receptacle.

In testimony that I claim the foregoing as my own, I have hereto affixed my signature in the presence of two witnesses.

ARTHUR MORRISON.

Witnesses:
   F. E. HEROLD,
   O. C. DENTON.